(12) United States Patent
Nguyen et al.

(10) Patent No.: US 7,413,017 B2
(45) Date of Patent: Aug. 19, 2008

(54) METHODS AND COMPOSITIONS FOR INDUCING TIP SCREENOUTS IN FRAC-PACKING OPERATIONS

(75) Inventors: Philip D. Nguyen, Duncan, OK (US); Anne M. Culotta, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 357 days.

(21) Appl. No.: 10/950,072

(22) Filed: Sep. 24, 2004

(65) Prior Publication Data
US 2006/0065397 A1      Mar. 30, 2006

(51) Int. Cl.
E21B 43/26      (2006.01)
(52) U.S. Cl. .................. 166/308.1; 166/280.1
(58) Field of Classification Search ............... 166/308.1, 166/280.1
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Palmer ...................... 260/78.3 |
| 3,173,484 A | 3/1965 | Huitt et al ................. 166/280.1 |
| 3,195,635 A | 7/1965 | Fast .......................... 166/280.1 |
| 3,272,650 A | 9/1966 | MacVittie ...................... 134/7 |
| 3,302,719 A | 2/1967 | Fischer ..................... 166/280.2 |
| 3,364,995 A | 1/1968 | Atkins et al. ............. 166/280.1 |
| 3,366,178 A | 1/1968 | Malone et al. ........... 166/280.1 |
| 3,455,390 A | 7/1969 | Gallus ........................ 166/295 |
| 3,784,585 A | 1/1974 | Schmitt et al. .............. 260/861 |
| 3,819,525 A | 6/1974 | Hattenbrun ................. 252/132 |
| 3,828,854 A | 8/1974 | Templeton et al. ......... 166/307 |
| 3,836,465 A | 9/1974 | Rhudy et al. ............. 252/8.5 C |
| 3,868,998 A | 3/1975 | Lybarger et al. ............ 166/278 |
| 3,912,692 A | 10/1975 | Casey et al. ................ 260/78.3 |
| 3,948,672 A | 4/1976 | Harnsberger ................. 106/90 |
| 3,955,993 A | 5/1976 | Curtice ........................ 106/90 |
| 3,960,736 A | 6/1976 | Free et al. ............... 252/8.55 R |
| 3,968,840 A | 7/1976 | Tate ......................... 166/280.1 |
| 3,986,355 A | 10/1976 | Klaeger ....................... 60/369 |
| 3,998,272 A | 12/1976 | Maly .......................... 166/281 |
| 3,998,744 A | 12/1976 | Arnold et al. ............... 507/269 |
| 4,010,071 A | 3/1977 | Colegrove |
| 4,068,718 A | 1/1978 | Cooke, Jr. et al. ........ 166/280.2 |
| 4,169,798 A | 10/1979 | DeMartino ............. 252/8.55 R |
| 4,172,066 A | 10/1979 | Zweigle et al. ....... 260/29.6 TA |
| 4,261,421 A | 4/1981 | Watanabe ................... 166/281 |
| 4,265,673 A | 5/1981 | Pace et al. |
| 4,299,825 A | 11/1981 | Lee |
| 4,387,769 A | 6/1983 | Erbstoesser et al. ......... 166/295 |
| 4,460,052 A | 7/1984 | Gockel ........................ 175/72 |
| 4,470,915 A | 9/1984 | Conway ................. 252/8.55 R |
| 4,498,995 A | 2/1985 | Gockel ................. 252/8.5 LC |
| 4,502,540 A | 3/1985 | Byham |
| 4,506,734 A | 3/1985 | Nolte ....................... 166/308.1 |
| 4,521,316 A | 6/1985 | Sikorski ...................... 507/274 |
| 4,526,695 A | 7/1985 | Erbstoesser et al. ..... 252/8.55 R |
| 4,632,876 A | 12/1986 | Laird et al. ................. 428/404 |
| 4,694,905 A | 9/1987 | Armbruster ................. 166/280 |
| 4,715,967 A | 12/1987 | Bellis ....................... 252/8.551 |
| 4,716,964 A | 1/1988 | Erbstoesser et al. ......... 166/284 |
| 4,767,706 A | 8/1988 | Levesque .................... 435/176 |
| 4,772,346 A | 9/1988 | Anderson et al. |
| 4,785,884 A | 11/1988 | Armbruster ................. 166/280 |
| 4,793,416 A | 12/1988 | Mitchell |
| 4,797,262 A | 1/1989 | Dewitz ....................... 422/142 |
| 4,809,783 A | 3/1989 | Hollenbeck et al. ......... 166/307 |
| 4,817,721 A | 4/1989 | Pober ......................... 166/295 |
| 4,822,500 A | 4/1989 | Dobson Jr. et al. .......... 507/212 |
| 4,829,100 A | 5/1989 | Murphey et al. ............ 523/131 |
| 4,836,940 A | 6/1989 | Alexander .................. 507/119 |
| 4,843,118 A | 6/1989 | Lai et al. .................... 524/555 |
| 4,848,467 A | 7/1989 | Cantu et al. ................. 166/281 |
| 4,863,980 A | 9/1989 | Cowan et al. |

(Continued)

FOREIGN PATENT DOCUMENTS

EP          0 510 762 A2    4/1992

(Continued)

OTHER PUBLICATIONS

U.S. Appl. No. 10/650,101, Todd et al, filed Aug. 26, 2003.

(Continued)

*Primary Examiner*—William P Neuder
(74) *Attorney, Agent, or Firm*—Robert A. Kent; Baker Botts LLC

(57) ABSTRACT

A method of inducing tip screenout during a frac-packing treatment comprising injecting a proppant slurry into a subterranean formation, wherein the proppant slurry comprises a proppant material, a fracturing fluid, and degradable particulates and wherein the degradable particulates physically interact with themselves and with the proppant material to aid in inducing tip screenout. A method of preparing a proppant slurry for inducing tip screenout during a frac-packing treatment, comprising blending a proppant material with a fracturing fluid and degradable particulates wherein the degradable particulates physically interact with themselves and with the proppant material to aid in inducing tip screenout. A proppant slurry for inducing tip screenout during a frac-packing treatment, comprising a proppant material, a fracturing fluid, and degradable particulates wherein the degradable particulates physically interact with themselves and with the proppant material to aid in inducing tip screenout.

32 Claims, No Drawings

U.S. PATENT DOCUMENTS

| | | | |
|---|---|---|---|
| 4,886,354 A | 12/1989 | Welch et al. | 356/70 |
| 4,894,231 A | 1/1990 | Moreau et al. | 424/426 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | 507/119 |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | 606/230 |
| 5,161,615 A | 11/1992 | Hutchins et al. | 166/295 |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadia | 166/305 |
| 5,251,697 A | 10/1993 | Shuler | |
| 5,295,542 A | 3/1994 | Cole et al. | 166/278 |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | 424/426 |
| 5,492,177 A | 2/1996 | Yeh et al. | |
| 5,496,557 A | 3/1996 | Feijen et al. | 424/426 |
| 5,497,830 A | 3/1996 | Boles et al. | 166/300 |
| 5,499,678 A | 3/1996 | Surjaatmadja et al. | 166/298 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | 166/295 |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,783,527 A | 7/1998 | Dobson, Jr. et al. | 507/269 |
| 5,791,415 A | 8/1998 | Nguyen et al. | 166/280 |
| 5,799,734 A | 9/1998 | Norman et al. | |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,916,849 A | 6/1999 | House | |
| 5,924,488 A | 7/1999 | Nguyen et al. | 166/280 |
| 5,964,291 A | 10/1999 | Bourne et al. | 166/279 |
| 5,977,030 A | 11/1999 | House | |
| 5,979,557 A | 11/1999 | Card et al. | 166/300 |
| 5,996,693 A | 12/1999 | Heathman | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,291,013 B1 | 9/2001 | Gibson et al. | 427/213.3 |
| 6,300,286 B1 | 10/2001 | Dobson, Jr. et al. | 507/111 |
| 6,302,209 B1 | 10/2001 | Thompson et al. | |
| 6,308,788 B1 | 10/2001 | Patel et al. | 175/50 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,917 B2 | 12/2001 | Chatterji et al. | |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,422,326 B1 | 7/2002 | Brookey et al. | |
| 6,432,155 B1 | 8/2002 | Swazey et al. | |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer et al. | 507/236 |
| 6,527,051 B1 | 3/2003 | Reddy et al. | 166/300 |
| 6,554,071 B1 | 4/2003 | Reddy et al. | 166/293 |
| 6,566,310 B2 | 5/2003 | Chan | |
| 6,569,814 B1 | 5/2003 | Brady et al. | 507/201 |
| 6,578,630 B2 | 6/2003 | Simpson et al. | |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,691,780 B2 | 2/2004 | Nguyen et al. | 166/254.1 |
| 6,702,023 B1 | 3/2004 | Harris et al. | 166/307 |
| 6,710,019 B1 | 3/2004 | Sawdon et al. | 507/136 |
| 6,716,797 B2 | 4/2004 | Brookey | |
| 6,737,385 B2 | 5/2004 | Todd et al. | 507/140 |
| 6,761,218 B2 | 7/2004 | Nguyen et al. | 166/278 |
| 6,763,888 B1 | 7/2004 | Harris et al. | 166/305.1 |
| 6,764,981 B1 | 7/2004 | Eoff et al. | |
| 6,793,018 B2 | 9/2004 | Dawson et al. | 166/300 |
| 6,793,730 B2 | 9/2004 | Reddy et al. | |
| 6,806,235 B1 | 10/2004 | Mueller et al. | |
| 6,817,414 B2 | 11/2004 | Lee | 166/278 |
| 6,818,594 B1 | 11/2004 | Freeman et al. | |
| 6,837,309 B2 * | 1/2005 | Boney et al. | 166/280.2 |
| 6,883,608 B2 | 4/2005 | Parlar et al. | |
| 6,896,058 B2 | 5/2005 | Munoz, Jr. et al. | 166/279 |
| 6,904,971 B2 | 6/2005 | Brothers et al. | |
| 6,949,491 B2 | 9/2005 | Cooke, Jr. | 507/219 |
| 6,959,767 B2 | 11/2005 | Horton et al. | |

| | | | |
|---|---|---|---|
| 6,978,838 B2 | 12/2005 | Parlar et al. ............... 166/311 |
| 6,981,552 B2 | 1/2006 | Reddy et al. |
| 6,983,801 B2 | 1/2006 | Dawson et al. ............. 166/300 |
| 6,987,083 B2 | 1/2006 | Phillippi et al. |
| 6,997,259 B2 | 2/2006 | Nguyen ..................... 166/276 |
| 7,007,752 B2 | 3/2006 | Reddy et al. |
| 7,021,377 B2 | 4/2006 | Todd et al. ................. 166/278 |
| 7,032,663 B2 | 4/2006 | Nguyen ..................... 166/276 |
| 7,036,586 B2 | 5/2006 | Roddy et al. ............... 166/277 |
| 7,036,587 B2 | 5/2006 | Munoz, Jr. et al. ......... 166/279 |
| 7,044,220 B2 | 5/2006 | Nguyen et al. ............. 166/279 |
| 7,044,224 B2 | 5/2006 | Nguyen ..................... 166/292 |
| 7,063,151 B2 | 6/2006 | Nguyen et al. |
| 7,066,258 B2 | 6/2006 | Justus et al. ............... 166/295 |
| 7,069,994 B2 * | 7/2006 | Cooke, Jr. ................ 166/308.5 |
| 7,080,688 B2 | 7/2006 | Todd et al. ................. 166/278 |
| 7,093,664 B2 | 8/2006 | Todd et al. ................. 166/376 |
| 7,096,947 B2 | 8/2006 | Todd et al. ................. 166/283 |
| 7,101,829 B2 | 9/2006 | Guichard et al. |
| 7,131,491 B2 | 11/2006 | Blauch et al. .............. 166/280 |
| 7,140,438 B2 | 11/2006 | Frost et al. ................. 166/307 |
| 7,147,067 B2 | 12/2006 | Getzlaf et al. |
| 7,151,077 B2 | 12/2006 | Prud'homme et al. ....... 507/219 |
| 7,156,174 B2 | 1/2007 | Roddy et al. ............... 166/293 |
| 7,165,617 B2 | 1/2007 | Lord et al. .............. 166/308.5 |
| 7,168,489 B2 | 1/2007 | Frost et al. ................. 166/278 |
| 7,172,022 B2 | 2/2007 | Reddy et al. ............... 166/292 |
| 7,178,596 B2 | 2/2007 | Blauch et al. .............. 166/280 |
| 7,195,068 B2 | 3/2007 | Todd ......................... 166/300 |
| 7,204,312 B2 | 4/2007 | Roddy et al. ............... 166/307 |
| 7,219,731 B2 | 5/2007 | Sullivan et al. ............. 166/278 |
| 7,228,904 B2 | 6/2007 | Todd et al. .............. 166/280.2 |
| 7,261,156 B2 | 8/2007 | Nguyen et al. |
| 7,264,051 B2 | 9/2007 | Nguyen et al. |
| 7,267,170 B2 | 9/2007 | Mang et al. ................ 166/279 |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 2001/0016562 A1 | 8/2001 | Muir et al. ................. 507/201 |
| 2002/0036088 A1 | 3/2002 | Todd ......................... 166/300 |
| 2002/0119169 A1 | 8/2002 | Angel et al. ................ 424/400 |
| 2002/0125012 A1 | 9/2002 | Dawson et al. ............. 166/300 |
| 2003/0054962 A1 | 3/2003 | England et al. ............. 507/117 |
| 2003/0060374 A1 | 3/2003 | Cooke, Jr. .................. 507/200 |
| 2003/0114314 A1 | 6/2003 | Ballard et al. .............. 507/100 |
| 2003/0130133 A1 | 7/2003 | Vallmer ...................... 507/100 |
| 2003/0147965 A1 | 8/2003 | Bassett et al. .............. 424/490 |
| 2003/0188766 A1 | 10/2003 | Banerjee et al. ................ 134/7 |
| 2003/0230407 A1 | 12/2003 | Vijn et al. ................... 166/292 |
| 2003/0234103 A1 | 12/2003 | Lee et al. ................... 166/293 |
| 2004/0014606 A1 | 1/2004 | Parlar et al. ................ 507/100 |
| 2004/0014607 A1 | 1/2004 | Sinclair et al. .............. 507/200 |
| 2004/0040706 A1 | 3/2004 | Hossaini et al. ............. 166/278 |
| 2004/0055747 A1 | 3/2004 | Lee ............................ 166/278 |
| 2004/0070093 A1 | 4/2004 | Mathiowitz et al. ............ 264/4 |
| 2004/0094300 A1 | 5/2004 | Sullivan et al. ........... 166/308.1 |
| 2004/0099416 A1 | 5/2004 | Vijn et al. ................... 166/292 |
| 2004/0106525 A1 | 6/2004 | Willbert et al. ............. 507/200 |
| 2004/0138068 A1 | 7/2004 | Rimmer et al. ............. 507/100 |
| 2004/0152601 A1 | 8/2004 | Still et al. ................... 507/100 |
| 2004/0152602 A1 | 8/2004 | Boles ......................... 507/100 |
| 2004/0162386 A1 | 8/2004 | Altes et al. ................. 524/806 |
| 2004/0170836 A1 | 9/2004 | Bond et al. ................. 428/398 |
| 2004/0214724 A1 | 10/2004 | Todd et al. ................. 507/117 |
| 2004/0216876 A1 | 11/2004 | Lee ........................... 166/280.1 |
| 2004/0231845 A1 | 11/2004 | Cooke, Jr. .................. 166/279 |
| 2004/0261993 A1 | 12/2004 | Nguyen ..................... 166/276 |
| 2004/0261995 A1 | 12/2004 | Nguyen et al. ............. 166/279 |
| 2004/0261996 A1 | 12/2004 | Munoz, Jr. et al. ......... 166/279 |
| 2004/0261999 A1 | 12/2004 | Nguyen ..................... 166/292 |
| 2005/0006095 A1 | 1/2005 | Justus et al. ............... 166/295 |
| 2005/0028976 A1 | 2/2005 | Nguyen ..................... 166/276 |
| 2005/0034861 A1 | 2/2005 | Saini et al. ................. 166/278 |
| 2005/0034865 A1 | 2/2005 | Todd et al. ................. 166/304 |
| 2005/0034868 A1 | 2/2005 | Frost et al. ................. 166/307 |
| 2005/0059556 A1 | 3/2005 | Munoz, Jr. et al. ......... 507/103 |
| 2005/0059557 A1 | 3/2005 | Todd et al. ................. 507/110 |
| 2005/0059558 A1 * | 3/2005 | Blauch et al. .............. 507/203 |
| 2005/0103496 A1 | 5/2005 | Todd et al. ................. 166/278 |
| 2005/0126785 A1 | 6/2005 | Todd et al. ................. 166/307 |
| 2005/0130848 A1 | 6/2005 | Todd et al. ................. 166/276 |
| 2005/0183741 A1 | 8/2005 | Surjaatmadja et al. ......... 134/6 |
| 2005/0205266 A1 | 9/2005 | Todd et al. ................. 166/376 |
| 2005/0252659 A1 | 11/2005 | Sullivan et al. ........... 166/280.1 |
| 2005/0272613 A1 | 12/2005 | Cooke, Jr. .................. 507/219 |
| 2005/0277554 A1 | 12/2005 | Blauch et al. .............. 507/224 |
| 2006/0016596 A1 | 1/2006 | Pauls et al. ................ 507/276 |
| 2006/0032633 A1 | 2/2006 | Nguyen ..................... 166/280 |
| 2006/0046938 A1 | 3/2006 | Harris et al. ................ 507/219 |
| 2006/0048938 A1 | 3/2006 | Kalman ..................... 166/278 |
| 2006/0105917 A1 | 5/2006 | Munoz, Jr. ................. 507/103 |
| 2006/0283597 A1 | 12/2006 | Schriener et al. ............ 166/300 |

FOREIGN PATENT DOCUMENTS

| | | |
|---|---|---|
| EP | 0 879 935 A2 | 11/1998 |
| EP | 0 879 935 A3 | 10/1999 |
| EP | 1 413 710 A1 | 4/2004 |
| WO | WO 93/15127 | 8/1993 |
| WO | WO 93/15127 A1 | 8/1993 |
| WO | WO 94/07949 | 4/1994 |
| WO | WO 94/07949 A1 | 4/1994 |
| WO | WO 94/08078 | 4/1994 |
| WO | WO 94/08078 A1 | 4/1994 |
| WO | WO 94/08090 | 4/1994 |
| WO | WO 94/08090 A1 | 4/1994 |
| WO | WO 95/09879 | 4/1995 |
| WO | WO 95/09879 A1 | 4/1995 |
| WO | WO 97/11845 | 4/1997 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

U.S. Appl. No. 10/655,883, Nguyen, filed Sep. 5, 2003.
U.S. Appl. No. 10/661,173, Todd et al, filed Sep. 11, 2003.
U.S. Appl. No. 10/664,126, Todd et al, filed Sep. 17, 2003.
U.S. Appl. No. 10/736,152, Todd, filed Dec. 15, 2003.
U.S. Appl. No. 10/765,334, Todd et al, filed Jan. 27, 2004.
U.S. Appl. No. 10/768,323, Roddy, et al, filed Jan. 30, 2004.
U.S. Appl. No. 10/768,864, Roddy et al, filed Jan. 30, 2004.
U.S. Appl. No. 10/769,490, Roddy et al, filed Jan. 30, 2004.
U.S. Appl. No. 10/783,207, Surjaatmadja et al, Feb. 20, 2004.
U.S. Appl. No. 10/785,300, Frost et al, filed Feb. 24, 2004.
U.S. Appl. No. 10/802,340, Reddy et al, filed Mar. 17, 2004.
U.S. Appl. No. 10/803,668, Todd et al, filed Mar. 17, 2004.
U.S. Appl. No. 10/803,689, Todd et al, filed Mar. 18, 2004.
U.S. Appl. No. 10/832,163, Munoz, Jr. et al, filed Apr. 26, 2004.
U.S. Appl. No. 10/897,509, Pauls et al, filed Jul. 23, 2004.
U.S. Appl. No. 10/915,024, Nguyen, filed Aug. 10, 2004.
U.S. Appl. No. 10/932,749, Harris et al, filed Sep. 2, 2004.
U.S. Appl. No. 10/933,705, Kalman, filed Sep. 3, 2004.
U.S. Appl. No. 10/947,427, Blauch et al, filed Sep. 20, 2004.
Y. Chiang et al.: "Hydrolysis Of Ortho Esters: Further Investigation Of The Factors Which Control The Rate-Determining Step," Engineering Information Inc., NY, NY, vol. 105, No. 23 (XP-002322842).

M. Ahmed et al.: Ortho Ester Hydrolysis: Direct Evidence For A Three-Stage Reaction Mechanism, Engineering Information Inc., NY, NY, vol. 101, No. 10 (XP-002322843).

Skrabal et al., *The Hydrolysis Rate of Orthoformic Acid Ethyl Ether*, Chemical Institute of the University of Graz, pp. 1-38.

Heller, et al., *Poly(ortho esters)-From Concept To Reality*, Biomacromolecules, vol. 5, No. 5, 2004 (pp. 1625-1632).

Schwach-Abdellaoui, et al., *Hydrolysis and Erosion Studies of Autocatalyzed Poly(ortho esters)Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development of a Poly(ortho ester) prototype With A Latent Acid in The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho esters) s— their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly(Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug., 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "Trigger" Useful for Oilfield Applications*, Society of Petroleum Engineers, Inc., SPE 92709.

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

U.S. Appl. No. 10/864,061, entitled "Aqueous Tackifier and Methods of Controlling Particulates" by Matthew E. Blauch, et al.

U.S. Appl. No. 10/864,618, entitled "Aqueous-Based Tackifier Fluids and Methods of Use" by Matthew E. Blauch, et al.

Cantu, et al, *Laboratory and Field Evaluation of a Combined Fluid-Loss-Control Additive and Gel Breaker for Fracturing Fluids*; SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, A *New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

\* cited by examiner

METHODS AND COMPOSITIONS FOR INDUCING TIP SCREENOUTS IN FRAC-PACKING OPERATIONS

BACKGROUND

The present invention relates to methods and compositions for use in subterranean frac-packing treatments. More particularly, the present invention relates to methods and compositions for inducing tip screenouts in frac-packing treatments.

Subterranean formations, such as hydrocarbon-producing wells, are often stimulated using hydraulic fracturing treatments. In a hydraulic fracturing treatment, a viscous fracturing fluid is injected into a subterranean formation at a rate and pressure sufficient to causethe formation to break down and produce one or more fractures. Particulate solids, such as graded sand, suspended in a portion of the fracturing fluid are then deposited into the fracture when the fracturing fluid is converted to a thin film to be returned to the surface. These particulate solids, or "proppant," serve to prevent the fractures from fully closing so that conductive channels are formed through which produced hydrocarbons can flow.

It is often desirable to maximize the length of the fractures created by hydraulic fracturing treatments, so that the surface area of the fractures, and therefore the area serviced by the well, may be maximized. However, in certain frac-packing treatments, particularly in weakly-consolidated, highly-permeable sand formations, it may be more desirable to form short, wide fractures that feature high fracture conductivities. One way of creating such short, wide fractures is with a tip screenout.

In a tip screenout, the growth of the fracture length is arrested when the proppant concentration at the tip of the fracture becomes highly concentrated, typically due to fluid leak-off into the surrounding formation. The concentrated proppant slurry plugs the fracture and prevents additional lengthening of the fracture. Any additional pumping of the proppant slurry beyond this point causes the fracture to widen or balloon and packs the existing fracture length with additional proppant. This results in a relatively short, wide fracture having both a high fracture conductivity and a high proppant concentration.

Design features typically employed in situations in which a tip screenout is desired often involve methods of ensuring that fluid leak-off is high relative to the rate and amount of proppant injection. This can be achieved in a number of ways, including, but not limited to, using a small amount of pad fluid to initiate the fracture, using little or no fluid loss additive, using high proppant concentrations earlier in the treatment, pumping more slowly during the fracturing operation, or some combination thereof. However, even using such methods, pressure transients collected by downhole pressure gauges during frac-packing treatments indicate that tip screenouts often do not occur when and where desired or intended. Instead, the fluid at the tip of the fracture often remains mobile, the fracture tip continues to grow throughout the treatment, and the desired proppant concentration in the fracture is not reached. Because of this, the desired high fracture conductivity may not be obtained.

SUMMARY

The present invention relates to methods and compositions for use in subterranean frac-packing treatments. More particularly, the present invention relates to methods and compositions for inducing tip screenouts in frac-packing treatments.

One embodiment of the present invention provides a method of inducing tip screenout during a frac-packing treatment comprising injecting a proppant slurry into a subterranean formation, wherein the proppant slurry comprises a proppant material, a fracturing fluid, and degradable particulates and wherein the degradable particulates physically interact with themselves and with the proppant material to aid in inducing tip screenout.

Another embodiment of the present invention provides a method of preparing a proppant slurry for inducing tip screenout during a frac-packing treatment, comprising blending a proppant material with a fracturing fluid and degradable particulates wherein the degradable particulates physically interact with themselves and with the proppant material to aid in inducing tip screenout.

Another embodiment of the present invention provides a proppant slurry for inducing tip screenout during a frac-packing treatment, comprising a proppant material, a fracturing fluid, and degradable particulates wherein the degradable particulates physically interact with themselves and with the proppant material to aid in inducing tip screenout.

The features and advantages of the present invention will be readily apparent to those skilled in the art upon a reading of the description of the preferred embodiments that follows.

DETAILED DESCRIPTION

The present invention relates to methods and compositions for use in subterranean frac-packing treatments. More particularly, the present invention relates to methods and compositions for inducing tip screenouts in frac-packing treatments.

In accordance with the teachings of the present invention, proppant slurries comprising degradable particulates, preferably in the form of fibers, are used to induce tip screenouts in frac-packing treatments. The degradable particulates may act as a bridging-inducing material and promote or assist in the bridging of the proppant particles, inter alia, by significantly increasing the number and severity of the interparticle interactions within the slurry. When present at concentrations sufficient to initiate proppant bridging, the degradable particulate causes tip screenout while not undermining the permeability or conductivity of the propped fractures after the treatment.

Proppant particles used in accordance with the present invention are generally of a size such that formation particulates that may migrate with produced fluids are prevented from being produced from the subterranean zone. Any suitable proppant may be used, including graded sand, bauxite, ceramic materials, glass materials, walnut hulls, polymer beads, and the like. Generally, the proppant has a size in the range of from about 4 mesh to about 400 mesh, U.S. Sieve Series. In some embodiments of the present invention, the proppant is graded sand having a particle size in the range of from about 10 mesh to about 70 mesh, U.S. Sieve Series.

Any fracturing fluid suitable for a fracturing application may be used in accordance with the teachings of the present invention, including aqueous gels, foams, emulsions, and other suitable fracturing fluids. Suitable aqueous gels are generally comprised of water and one or more gelling agents. Suitable emulsions can be comprised of two immiscible liquids such as an aqueous gelled liquid and a hydrocarbon fluid or other immiscible liquid. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, fracturing fluid, inter alia, allows the fracturing fluid to transport significant quantities of suspended proppant. The water used to form the fracturing fluid may be saltwater, brine, or any other aqueous liquid that does not adversely react with the other components.

A variety of gelling agents may be used, including hydratable polymers that contain one or more functional groups such as hydroxyl, carboxyl, sulfate, sulfonate, amino, or amide groups. Particularly useful are polysaccharides and derivatives thereof that contain one or more of the monosaccharide units galactose, mannose, glucoside, glucose, xylose, arabinose, fructose, glucuronic acid, or pyranosyl sulfate. Examples of natural hydratable polymers containing the foregoing functional groups and units that are particularly useful in accordance with the present invention include guar gum and derivatives thereof, such as hydroxypropyl guar, and cellulose derivatives, such as hydroxyethyl cellulose. Hydratable synthetic polymers and copolymers that contain the above-mentioned functional groups can also be used. Examples of such synthetic polymers include, but are not limited to, polyacrylate, polymethacrylate, polyacrylamide, polyvinyl alcohol, and polyvinylpyrrolidone. The gelling agent used is generally combined with the water in the fracturing fluid in an amount in the range of from about 0.01% to about 2% by weight of the water.

Examples of crosslinking agents that can be used to further increase the viscosity of a gelled fracturing fluid are alkali metal borates, borax, boric acid, and compounds that are capable of releasing multivalent metal ions in aqueous solutions. Examples of multivalent metal ions include chromium, zirconium, antimony, titanium, iron, zinc, or aluminum. When used, the crosslinking agent is generally added to the gelled water in an amount in the range of from about 0.01% to about 5% by weight of the water.

The gelled or gelled and cross-linked fracturing fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place proppant in subterranean fractures. The gel breaker used is typically present in the fracturing fluid in an amount in the range of from about 1% to about 5% by weight of the gelling agent. The fracturing fluids may also include one or more of a variety of well-known additives, such as gel stabilizers, fluid loss control additives, clay stabilizers, bactericides, and the like.

As noted above, in embodiments of the present invention, the proppant slurry further comprises degradable particulates, preferably in the form of fibers. Typically, this degradable particulate is mixed with the fracturing fluid prior to the addition of the proppant to the fracturing fluid. Optionally, the degradable particulate and proppant may be added to the carrier fluid simultaneously, or the degradable particulate and proppant may be pre-blended together prior to being added to the fracturing fluid.

Generally, suitable degradable particulates used in the present invention are formed of materials capable of undergoing an irreversible degradation down hole. As referred to herein, the term "irreversible" will be understood to mean that the degradable material, once degraded down hole, should not reconstitute while down hole, e.g., the degradable material should degrade in situ but should not reconstitute in situ. The terms "degradation" and "degradable" refer to oxidative degradation, hydrolytic degradation, enzymatic degradation, or thermal degradation that the degradable material may undergo. In hydrolytic degradation, the degradable particulate degrades, or dissolves, when exposed to water.

Non-limiting examples of degradable materials that may be used in conjunction with the present invention include, but are not limited to aromatic polyesters and aliphatic polyesters. Such polyesters may be linear, graft, branched, crosslinked, block, star shaped, dendritic, etc. Some suitable polyesters include poly(hydroxy alkanoate) (PHA); poly(alpha-hydroxy) acids such as polylactic acid (PLA), polygylcolic acid (PGA), polylactide, and polyglycolide; poly(beta-hydroxy alkanoates) such as poly(beta-hydroxy butyrate) (PHB) and poly(beta-hydroxybutyrates-co-beta-hydroxyvelerate) (PHBV); poly(omega-hydroxy alkanoates) such as poly(beta-propiolactone) (PPL) and poly($\epsilon$-caprolactone) (PCL); poly(alkylene dicarboxylates) such as poly(ethylene succinate) (PES), poly(butylene succinate) (PBS); and poly(butylene succinate-co-butylene adipate); polyanhydrides such as poly(adipic anhydride); poly(orthoesters); polycarbonates such as poly(trimethylene carbonate); and poly(dioxepan-2-one)]. Derivatives of the above materials may also be suitable, in particular, derivatives that have added functional groups that may help control degradation rates.

The rate at which the degradable material degrades may depend on, inter alia, other chemicals present, temperature, and time. Furthermore, the degradability of the degradable material depends, at least in part, on its structure. For instance, the presence of hydrolyzable and/or oxidizable linkages often yields a material that will degrade as described herein. The rates at which such degradable materials degrade are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the degradable material degrades also may be affected by the environment to which the polymer is exposed, e.g., temperature, presence of moisture, oxygen, microorganisms, enzymes, pH, and the like.

A variety of processes may be used to prepare degradable polymers that are suitable for use in the crosslinked fluids of the present invention. Examples of such processes include, but are not limited to, polycondensation reactions, ring-opening polymerizations, free radical polymerizations, anionic polymerizations, carbocationic polymerizations, coordinative ring-opening polymerizations, and any other appropriate processes.

Plasticizers may be present in the polymeric degradable materials used to create degradable particulates for use in the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. The plasticizers, if used, are preferably at least intimately incorporated within the degradable polymeric materials.

Polyanhydrides are another type of particularly suitable degradable material that may be used to create the degradable particulates useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material used can be further tailored by blending, and copolymerizing it with another polymer, or by a change in the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly (phenyllactide) will degrade at about ⅕th of the rate of racemic poly(lactide) at a pH of 7.4 at 55° C. One of ordinary skill in the art, with the benefit of this disclosure, will be able to determine the appropriate degradable polymer to achieve the desired physical properties of the degradable polymers.

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and, as a result, degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution, which may be desirable. Another example would include a blend of poly (lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material to create a degradable particulate suitable for use in the present invention, one should consider the degradation products that will result. These degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells. A preferable result may be achieved in cases wherein the degradable particulates degrade slowly over time as opposed to instantaneously.

In particular embodiments of the present invention, the degradable particulate may be selected to have a desired size, shape, and/or density to help maintain a substantially uniform, or homogeneous, proppant slurry mixture essentially free of segregation. In particular embodiments of the present invention, these features may also be modified to allow for optimum bridging capability while maintaining desirable filtering capability during hydrocarbon production. For example, in one embodiment of the present invention, the degradable particulate may take the form of fibers—that is, particles having an aspect ratio such that they have a greater length than width. In one embodiment, such fibers have dimensions of about 0.01 mm to about 0.1 mm in diameter and about 5 mm to about 20 mm in length. In another embodiment, the degradable particulate may be a graded-size particulate. In some embodiments, the degradable particulates have an average size ranging from about 4 mesh to about 100 mesh, U.S. Sieve Series. In other embodiments, the degradable particulates have an average size ranging from about 10 mesh to about 60 mesh, U.S. Sieve Series. In this way, the physical size and shape of the degradable particulate may be selected to enhance the tip screenout of proppant slurry in a fracture.

Additionally, in particular embodiments of the present invention, the concentration of degradable particulate may be increased proportionally as the concentration of the proppant in the slurry stage is increased. Typically, the degradable particulate is present in the slurry in an amount in the range of from about 0.1% to about 5% by weight of the fracturing fluid in the slurry.

In a particular embodiment of the present invention, the proppant material of the slurry may also be coated with a tackifying agent. Typically, the application of the tackifying agent is performed prior to the addition of the proppant to the fracturing fluid and degradable particulate matter. The tackifying agent causes the proppant grains to, at least partially, form clusters or aggregates. Combined with the degradable particulate, such clusters help to induce a tip screenout. Compositions suitable for use as tackifying agents in accordance with the present invention comprise any compound that, when in liquid form or in a solvent solution, will form a non-hardening coating upon a proppant particle.

One type of tackifying agent suitable for use in the present invention comprises polyamides that are liquids or in solution at the temperature of the subterranean formation such that they are non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds that may be used as tackifying compounds include liquids and solutions of, for example, polyesters, polycarbonates, polycarbamates, natural resins such as shellac, and the like. Other suitable tackifying agents are described in U.S. Pat. No. 5,853,048, issued to Weaver, et al. and U.S. Pat. No. 5,833,000, issued to Weaver, et al., the relevant disclosures of which are herein incorporated by reference.

In other embodiments, suitable tackifying agents include those materials that are soluble in aqueous solvents. Suitable such aqueous tackifier agents are not significantly tacky when placed onto a particulate, but are capable of being "activated" (that is, destabilized, coalesced, and/or reacted) to transform the compound into a sticky, tackifying compound at a desirable time. Such activation may occur before, during, or after the aqueous tackifier compound is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifier compound enhances the grain-to-grain contact between the individual particulates within the formation (be they proppant particulates, formation fines, or other particulates), helping bring about the consolidation of the particulates into a cohesive, flexible, and permeable mass. Examples of aqueous tackifier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly (methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifier agents and additional disclosure on aqueous tackifier agents can be found in U.S. patent application Ser. No. 10/864,061, filed Jun. 9, 2004 and U.S. patent application Ser. No. 10/864,618, filed Jun. 9, 2004 the relevant disclosures of which are hereby incorporated by reference.

In another embodiment of the present invention, the proppant material of the slurry may be coated with a curable resin. Typically, the application of the curable resin is performed prior to adding the proppant to, and blending in, the fracturing fluid and degradable particulate matter. Similar to a tackifying agent, the tackiness of the curable resin causes the proppant matter to form clusters or aggregates. The combination of degradable particulate and resin-coated proppant helps induce tip screenout during the proppant stage. Additionally, the clusters, or aggregates, of proppant allow the proppant material to form a consolidated, permeable proppant pack, at least partially eliminating the need for annular gravel packing and/or a sand control screen. Suitable resins include, but are not limited to, novolak resins, polyepoxide resins, phenol-aldehyde resins, urea-aldehyde resins, urethane resins, phenolic resins, furan/furfuryl alcohol resins, phenolic/latex resins, phenol formaldehyde resins, polyester resins and hybrids and copolymers thereof, polyurethane resins and hybrids and copolymers thereof, and acrylate resins, and mixtures thereof. It is within the ability of one skilled in the art to select a resin suitable for use in the down hole environment at issue.

The resin may either be applied to the proppant on-the-fly during the treatment, or may be a precoated resin as is widely commercially available. Suitable commercially available resin-coated proppant materials include, but are not limited to, pre-cured resin-coated sand; curable resin-coated sand; curable resin-coated ceramics; and single-coat, dual-coat, or multi-coat resin-coated sand, ceramic, or bauxite. Some examples available from Borden Chemical, Columbus, Ohio, are "XRT™CERAMAX P," "CERAMAX I," "CERAMAX P," "ACFRAC BLACK," "ACFRAC CR," "ACFRAC SBC," "ACFRAC SB," and "ACFRAC LTC." Some examples available from Santrol, Fresno, Tex., are "HYPERPROP G2," "DYNAPROP G2," "MAGNAPROP G2," "OPTIPROP G2," "SUPER HS," "SUPER DC," "SUPER LC," and "SUPER HT."

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of inducing tip screenout during a frac-packing treatment comprising injecting a proppant slurry into a subterranean formation, wherein the proppant slurry comprises a proppant material, a fracturing fluid, and degradable particulates, wherein the proppant material is at least partially coated with a tackifying agent or a curable resin, and wherein the degradable particulates physically interact with themselves and with the proppant material to aid in inducing tip screenout.

2. The method of claim 1 wherein the degradable particulates are in the form of fibers.

3. The method of claim 2 wherein the fibers range in diameter from about 0.01 mm to about 0.1 mm.

4. The method of claim 2 wherein the fibers range in length from about 5 mm to about 20 mm.

5. The method of claim 1 wherein the degradable particulates are present in an amount sufficient to initiate proppant bridging.

6. The method of claim 1 wherein the degradable particulates are present in the proppant slurry an amount of from about 0.1% to about 5% by weight of the fracturing fluid in the proppant slurry.

7. The method of claim 1 wherein the degradable particulates are transformable from a solid state to a non-solid state by oxidative degradation, hydrolytic degradation, thermal degradation, enzymatic degradation, or a combination thereof.

8. The method of claim 1 wherein the degradable particulates are selected from the group consisting of aromatic polyesters, aliphatic polyesters, dehydrated salts, and combinations thereof.

9. The method of claim 1 wherein the degradable particulates comprise a poly(orthoester) one or more poly(orthoesters).

10. The method of claim 1 wherein the degradable particulates comprise sodium acetate trihydrate.

11. A method of inducing tip screenout during a frac-packing treatment comprising injecting a proppant slurry into a subterranean formation, wherein the proppant slurry comprises a proppant material, a fracturing fluid, and degradable particulates, wherein the degradable particulates comprises one or more poly(orthoesters), and wherein the degradable particulates physically interact with themselves and with the proppant material to aid in inducing tip screenout.

12. The method of claim 11 wherein the degradable particulates are in the form of fibers.

13. The method of claim 12 wherein the fibers range in diameter from about 0.01 mm to about 0.1 mm.

14. The method of claim 12 wherein the fibers range in length from about 5mm to about 20 mm.

15. The method of claim 11 wherein the degradable particulates are present in an amount sufficient to initiate proppant bridging.

16. The method of claim 11 wherein the degradable particulates are present in the proppant slurry an amount of from about 0.1% to about 5% by weight of the fracturing fluid in the proppant slurry.

17. The method of claim 11 wherein the proppant material is at least partially coated with a tackifying agent.

18. The method of claim 11 wherein the proppant material is at least partially coated with a curable resin.

19. The method of claim 11 wherein the degradable particulates are transformable from a solid state to a non-solid state by oxidative degradation, hydrolytic degradation, thermal degradation, enzymatic degradation, or a combination thereof.

20. The method of claim 11 wherein the degradable particulates are selected from the group consisting of aromatic polyesters, aliphatic polyesters, dehydrated salts, and combinations thereof.

21. The method of claim 11 wherein the degradable particulates comprise sodium acetate trihydrate.

22. A method of inducing tip screenout during a frac-packing treatment comprising injecting a proppant slurry into a subterranean formation, wherein the proppant slurry comprises a proppant material, a fracturing fluid, and degradable particulates, wherein the degradable particulates comprise sodium acetate trihydrate, and wherein the degradable particulates physically interact with themselves and with the proppant material to aid in inducing tip screenout.

23. The method of claim 22 wherein the degradable particulates are in the form of fibers.

24. The method of claim 23 wherein the fibers range in diameter from about 0.01 mm to about 0.1 mm.

25. The method of claim 23 wherein the fibers range in length from about 5mm to about 20 mm.

26. The method of claim 22 wherein the degradable particulates are present in an amount sufficient to initiate proppant bridging.

27. The method of claim 22 wherein the degradable particulates are present in the proppant slurry an amount of from about 0.1% to about 5% by weight of the fracturing fluid in the proppant slurry.

28. The method of claim 22 wherein the proppant material is at least partially coated with a tackifying agent.

29. The method of claim 22 wherein the proppant material is at least partially coated with a curable resin.

30. The method of claim 22 wherein the degradable particulates are transformable from a solid state to a non-solid state by oxidative degradation, hydrolytic degradation, thermal degradation, enzymatic degradation, or a combination thereof.

31. The method of claim 22 wherein the degradable particulates are selected from the group consisting of aromatic polyesters, aliphatic polyesters, dehydrated salts, and combinations thereof.

32. The method of claim 22 wherein the degradable particulates comprise a poly(orthoester) one or more poly(orthoesters).

* * * * *